US012786091B2

(12) United States Patent
Pettyjohn et al.

(10) Patent No.: US 12,786,091 B2

(45) Date of Patent: Nov. 3, 2026

(54) SYSTEMS AND METHODS FOR MONITORING PERFORMANCE OF NETWORK RESOURCES

(71) Applicant: The Bank of New York Mellon, New York, NY (US)

(72) Inventors: Scott Pettyjohn, New York, NY (US); Brent Haley, New York, NY (US); Austin Joseph, New York, NY (US); Sreenivasa Daka, New York, NY (US)

(73) Assignee: THE BANK OF NEW YORK MELLON, New York, NY (US)

(*) Notice: Subject to any disclaimer, the term of this patent is extended or adjusted under 35 U.S.C. 154(b) by 58 days.

(21) Appl. No.: 18/945,482

(22) Filed: Nov. 12, 2024

(65) Prior Publication Data

US 2026/0135792 A1 May 14, 2026

(51) Int. Cl.

*H04L 43/12* (2022.01)

*H04L 43/50* (2022.01)

(52) U.S. Cl.

CPC .............. *H04L 43/12* (2013.01); *H04L 43/50* (2013.01)

(58) Field of Classification Search

CPC ................................ H04L 43/12; H04L 43/50

See application file for complete search history.

(56) References Cited

U.S. PATENT DOCUMENTS

| | | | | |
|---|---|---|---|---|
| 7,185,342 | B1 * | 2/2007 | Carrer | H04L 67/02 709/219 |
| 7,350,209 | B2 | 3/2008 | Shum | |
| 7,490,323 | B2 | 2/2009 | D'Alo et al. | |
| 8,010,654 | B2 | 8/2011 | Hunt et al. | |

(Continued)

FOREIGN PATENT DOCUMENTS

| | | | |
|---|---|---|---|
| CN | 110502424 | A | 11/2019 |
| CN | 110781065 | A | 2/2020 |

(Continued)

OTHER PUBLICATIONS

China, Chrystal R. "What is application performance management (APM)?" https://www.ibm.com/topics/application-performance-management, accessed Sep. 10, 2024.

(Continued)

*Primary Examiner* — Michael Won

(74) *Attorney, Agent, or Firm* — NORTON ROSE FULBRIGHT US LLP

(57) ABSTRACT

Systems, methods, and computer-readable storage media for generating testing sequences for evaluating network resources are shown. In an aspect, the method includes determining, by one or more processors, a set of probes from among a plurality of probes. Each probe may be configured to perform an operation with respect to a network resource. Dependency and timing information are defined for the set of probes. A testing sequence is generated based on the set of probes, the dependency information, and the timing information, where the testing sequence is executable by a testing service to perform one or more tests associated with the one or more network resources. In addition to supporting methods for defining and executing testing sequences, some example embodiments enable data to be passed between probes during execution of a testing sequence.

20 Claims, 5 Drawing Sheets

(56) References Cited

U.S. PATENT DOCUMENTS

| | | | | |
|---|---|---|---|---|
| 8,112,771 | B2 | 2/2012 | Bernabeu-Auban et al. | |
| 8,656,355 | B2 | 2/2014 | Oberlin et al. | |
| 10,212,031 | B2 | 2/2019 | Subramanian et al. | |
| 10,320,648 | B2 * | 6/2019 | Burbridge | H04L 43/00 |
| 10,425,321 | B2 * | 9/2019 | Joseph | H04L 43/50 |
| 10,469,330 | B1 | 11/2019 | Roth et al. | |
| 10,671,507 | B2 | 6/2020 | Prabath et al. | |
| 10,803,397 | B2 | 10/2020 | Desikachari et al. | |
| 10,884,805 | B2 | 1/2021 | Huang et al. | |
| 11,005,722 | B2 | 5/2021 | Valisammagari et al. | |
| 11,283,696 | B2 * | 3/2022 | Eardley | H04L 41/142 |
| 11,334,461 | B2 | 5/2022 | Kammath et al. | |
| 11,605,010 | B1 | 3/2023 | Kapoor | |
| 2011/0087767 | A1 * | 4/2011 | Sonkin | G06F 9/44505 709/224 |
| 2011/0161395 | A1 * | 6/2011 | O'Donnell, III | G06F 11/3414 714/39 |
| 2017/0104637 | A1 * | 4/2017 | Gianrossi | H04L 43/50 |
| 2017/0324627 | A1 | 11/2017 | Eardley et al. | |
| 2019/0065349 | A1 * | 2/2019 | Sharma | G06F 11/3684 |
| 2020/0296029 | A1 * | 9/2020 | Shenoy | H04L 45/302 |
| 2022/0138081 | A1 * | 5/2022 | Varma | G06F 11/3684 717/124 |
| 2023/0188525 | A1 | 6/2023 | Singh et al. | |
| 2023/0262478 | A1 * | 8/2023 | Hu | H04W 16/18 370/254 |
| 2024/0259280 | A1 | 8/2024 | Stavisski et al. | |
| 2025/0007813 | A1 * | 1/2025 | Bothe | H04L 43/12 |

FOREIGN PATENT DOCUMENTS

| | | | |
|---|---|---|---|
| CN | 111200526 | B | 9/2022 |
| CN | 116594740 | A | 8/2023 |
| CN | 111190638 | B | 3/2024 |

OTHER PUBLICATIONS

Arora, Harman, "Top 10 Application performance monitoring (APM) tools 2024," https://bigohtech.com/apm-monitoring-tools/, accessed Sep. 20, 2024.

* cited by examiner

SYSTEMS AND METHODS FOR MONITORING PERFORMANCE OF NETWORK RESOURCES

TECHNICAL FIELD

The present disclosure generally relates to network resource performance monitoring and more particularly to systems and methods for designing and executing processes to evaluate performance of network resources and resolving performance issues in network resources based on the evaluating.

BACKGROUND

Application and production service teams need ways to test application health. Existing solutions may be too complex for non-technical users or may not be comprehensive enough to be helpful. Enterprise monitoring already provides synthetic availability probes that may be displayed on dashboards and integrated into alerting and situation management tools. Despite such tools, manual validation of application health is often still required and is a time consuming and error-prone process. Some automation alternatives attempt to leverage tools that are complex and not accessible to non-technical users. Technical users may have the skillset for operating such automated solutions, but often do not have the time to learn several new technologies and processes just to implement application health checks. This has the potential to result in health checks not being updated as the application changes or no health check being created at all.

Testing platforms also allow for the creation and execution of a health checks by simulating user actions. For example, web based synthetic probes (WBS probes) are one type of probe that may be utilized to evaluate the health of a web application by simulating a user's clicks, typing and other actions or interactions within a webpage. WBS probes contain a set list of instructions for what actions should be taken on a web page and what elements or text should be located to assert the web page is healthy. However, the static nature of a WBS probe can lead to false unhealthy results. To illustrate, if a web application changes according to business requirements, but the WBS probe instructions have not been updated to accommodate the change in business requirement, the WBS probe will report an unhealthy web application despite the web application behaving as specified in the business requirements.

SUMMARY

To overcome the challenges described above, aspects of the present disclosure provide systems, methods, and computer-readable storage media providing functionality to support generation of testing sequences for evaluating network resources. In an aspect, a testing sequence may be generated using a testing user interface (UI). The testing UI may be populated with information associated with a plurality of probes (e.g., existing probes used for testing and evaluating network resources). Each probe of the plurality of probes may be configured to perform an operation with respect to a network resource (e.g., a database, a web page, a network application or service, a cloud function, a network element (e.g., router, switch, relay, etc.), and the like). In an aspect, the plurality of probes may be populated in the testing UI based on information received from a testing proxy.

The testing UI may enable configuration information to be defined for the testing sequence. The configuration information may include dependency information that organizes the probes selected for inclusion in the testing sequence into a hierarchy of probes that indicates an order of execution for the probes. The configuration information may include timing information for the set of probes. The timing information may indicate a frequency for executing the testing sequence, whether two or more probes of the testing sequence may be executed simultaneously, or both. The configuration information may also include stop criteria corresponding to particular probes of the testing sequence. The stop criteria may specify conditions that should be evaluated during execution of the testing sequence, such as after one or more probes. If a condition is satisfied, execution of the testing sequence may be terminated or stopped.

In an aspect, one or more conditions or stop criteria may be configured to generate an alert and/or a control signal. For example, when a stop criterion indicates a network resource is performing below a threshold performance level, an alert may be generated. In an aspect, one or more analytics may be used to evaluate results obtained from one or more probes. The analytics may be configured to characterize a state of the network resource based on the results obtained from executing one or more probes, and the control signal or alert may be generated based on the characterization of the state by the analytic.

The disclosed systems and methods also provide functionality that supports passing of data between probes during execution of the testing sequence. In an aspect, data generated during execution of a probe may be written to a virtual memory space allocated to the probe. Upon completing execution of the probe the data may be written to a file stored in memory. The file may then be used to initialize a virtual memory space allocated to a subsequently executed probe, where the initializing includes writing information of the file to the virtual memory space for the subsequent probe. The subsequently executed probe may then extract data from the virtual memory space regarding the prior executed probe and use the extracted data during performance of one or more operations of the subsequent probe.

Using the aforementioned features, which are described in more detail below with reference to FIGS. 1-7, a Testing Automation Platform (TAP) may be provided that enables existing probes to be combined by desired testing functionality to perform testing of network resources. The testing UI enables both technical and non-technical users to design and execute tests on network resources, such as health checks. The tests may be associated with analytics to enable results obtained from the testing to be evaluated and used to characterize the state of the network resource(s), enabling robust testing to be performed. Once tests are designed, the tests may be executed periodically according to the timing information defined during configuration of the testing sequence, thereby enabling automation of testing operations if desired. Additionally, the testing sequences and associated functionality (e.g., passing data between probes) may enable testing operations to be performed in a data center agnostic manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
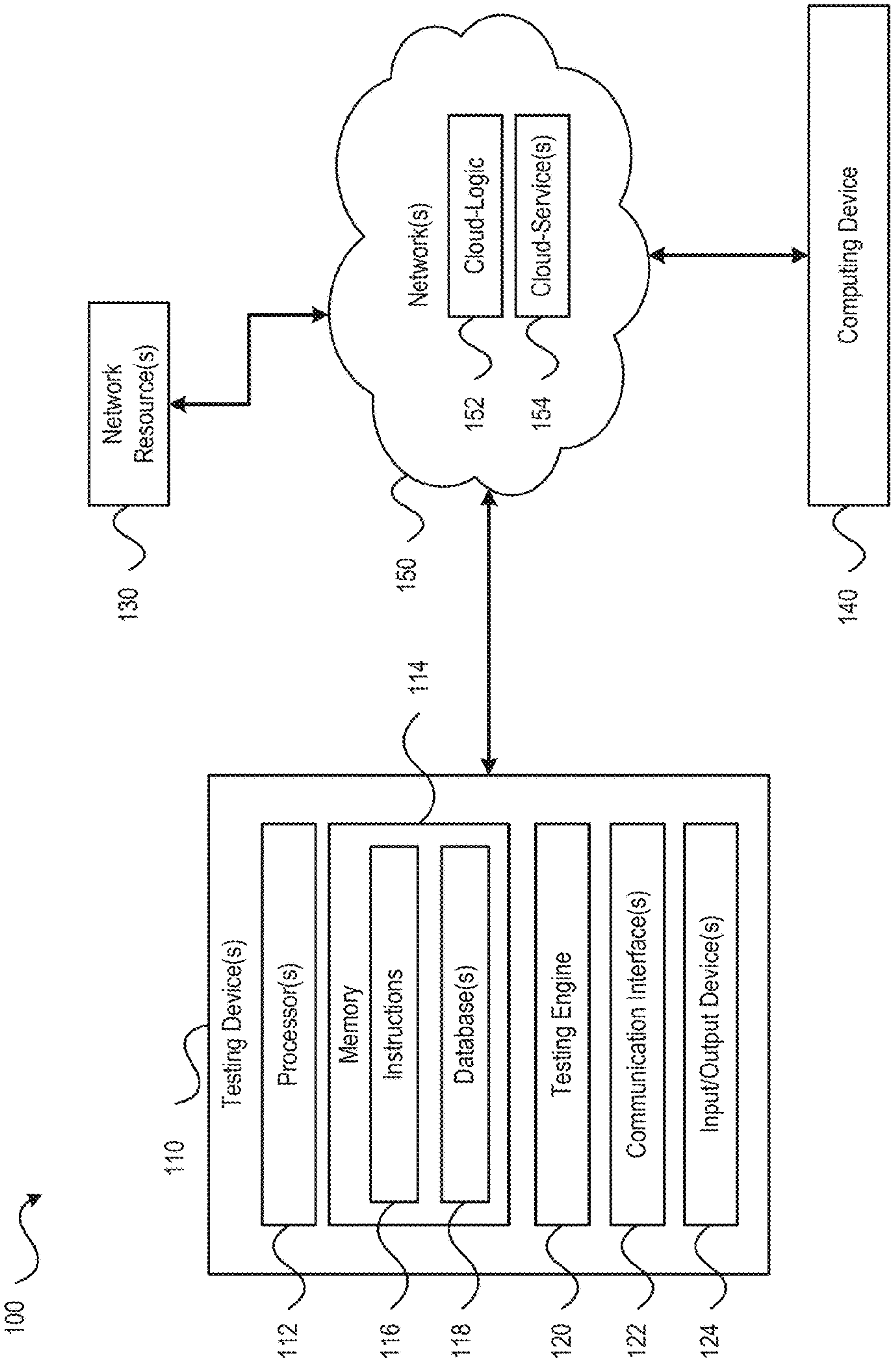
FIG. 1 is a block diagram illustrating an example system for designing and executing processes to evaluate performance of network resources in accordance with aspects of the present disclosure.

Referring to FIG. 1, a block diagram illustrating a system for designing and executing processes to evaluate performance of network resources in accordance with aspects of the present disclosure is shown as a system 100. As shown in FIG. 1, the system 100 includes a testing device 110. In an aspect, the functionality described with respect to the testing device 110 may be implemented via a cloud, as shown by cloud-logic 152, rather than via a server or other type of computing device. The testing device 110 includes one or more processors 112, a memory 114, one or more testing engines 120, one or more communication interfaces 122, and one or more input/output (I/O) devices 124. Each of the one or more processors 112 may be a central processing unit (CPU), a graphics processing unit (GPU), or other computing circuitry (e.g., a microcontroller, one or more application specific integrated circuits (ASICs), and the like) and each processor 112 may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the testing device 110 with reference to FIGS. 1-7. The one or more communication interfaces 122 may be configured to communicatively couple the testing device 110 to the one or more networks 150 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the testing device 110.

The one or more testing engines 120 may be configured to provide functionality to support processes for designing in accordance with the concepts described herein. For example, the testing engine(s) 120 may be configured to provide functionality to design and perform application performance health check monitoring and related functionality. For example, the one or more testing engines may be used to create a testing and automation platform (TAP) that provides application health check monitoring functionality that leverages and extends the capabilities of existing application health check tools and constructs. To illustrate, teams previously had to manually test their applications' health. Non-technical users would do so by manually logging in to websites or check various technology specific tools to determine if application assets were available and running in the desired data center. Technical users may perform similar health-checks in an ad-hoc manner using code-based health checks. In contrast, a system supported by TAP solves these problems by leveraging existing availability probes to create application health checks. Individual probes and tools are logically associated into groups to form an application health check. The probes may be sequenced into a workflow and each step of the workflow may be required to pass before a next step is executed. The grouping and workflow concepts are built on top of the existing monitoring solution without any modification to how the individual probes are created or executed. The functionality provided by the one or more testing engines 120 is configured to support management of probe grouping, workflow execution, and analytics that may be used to interpret and evaluate results from individual probes. The functionality provided by the one or more testing engines 120 is described in more detail below with reference to FIGS. 2-5.

Figure 2:
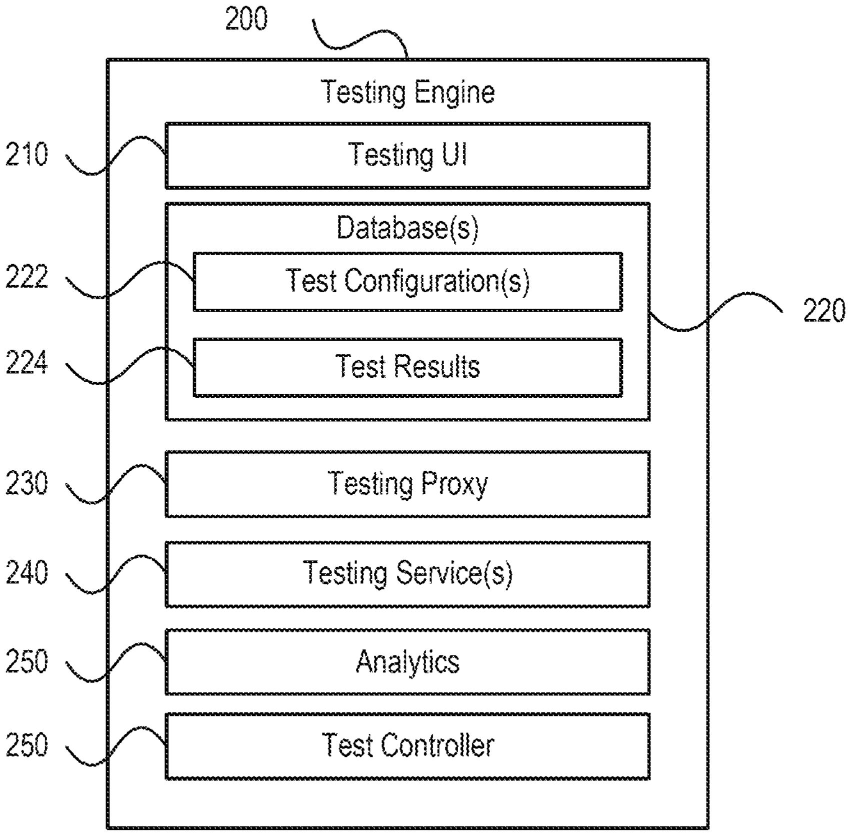
FIG. 2 is a block diagram illustrating an example testing engine in accordance with aspects of the present disclosure.

Referring to FIG. 2, a block diagram showing an example testing engine in accordance with aspects of the present disclosure, referred to herein as a testing engine 200. In an aspect, the testing engine 200 may be one of the one or more testing engines 120 of FIG. 1. As shown in FIG. 2, the testing engine 200 includes a testing user interface (UI) 210, one or more databases 220, a testing proxy 230, one or more testing services 240, and one or more analytics 250. The testing UI 210 may be configured to enable users to select available probes (e.g., application health check tools). For example, the testing UI 120 may provide interactive elements (e.g., buttons, dropdown menus, check boxes, radio buttons, or other types of interactive UI elements) to enable a user to select a set of probes from among an inventory of available probes. In an aspect, the inventory of available probes may be stored in a database, such as the database(s) 220 or the one or more databases 118 of FIG. 1. The user may select various ones of the available probes to form a set of probes and the set of probes may define a testing sequence that may be used to perform an application health check.

Figure 4:
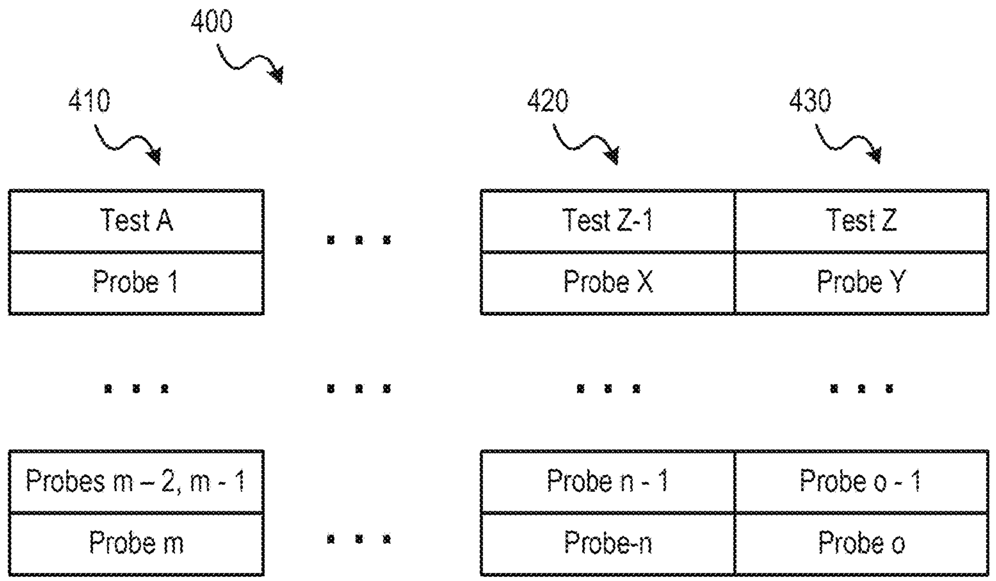
FIG. 4 shows example testing sequences in accordance with aspects of the present disclosure.

To illustrate, and referring to FIG. 4A, a block diagram illustrating example testing sequences defined in accordance with aspects of the present disclosure are shown. In particular, FIG. 4 shows a series of testing sequences 400 including (Z) testing sequences 410-430, where Z≥1. Testing sequence 410, shown in FIG. 4B as Test A, includes m probes defined to include Probe 1, . . . , Probe m−2, Probe m−1, and Probe m. Testing sequence 420, shown in FIG. 4 as Test Z 1, includes n probes defined to include Probe X, . . . , Probe n−1, and Probe n. Testing sequence 430, shown in FIG. 4 as Test Z, includes n probes defined to include Probe X, . . . , Probe o−1, and Probe o. Each of the probes included in the testing sequences 410-430 may be selected using a testing UI, such as the UI 210 of FIG. 2, by selecting various probes via interaction with interactive elements of the testing UI.

The testing UI may enable the user to specify dependencies between the probes during selection of the various probes included in a specific testing sequence (e.g., an order or sequence for execution of the probes). To illustrate, in Test A Probe 1 may be a first probe to be executed and Probe m may be a last probe to be executed. In addition to defining the order of execution for each of the probes included in Test A, the configuration of the probes in Test A may also define dependencies between the various probes. For example, the dependencies may specify whether execution of one of the probes in Test A is dependent upon successfully completing one or more prior probes, where the successful completion of a particular probe may be determined based on a result returned by one or more prior probes or another criterion (e.g., a threshold number of prior probes were executed, a value returned for a particular probe satisfied a threshold value, and the like).

Additionally, the testing UI may enable the user to specify whether two or more probes within a testing sequence may be executed simultaneously. For example, Test A includes Probes m−2 and m−1, which may be executed simultaneously. It is noted that where probes are executed simultaneously, a criterion for executing one or more subsequent probes may be dependent on the results of executing multiple probes or only one of the probes. As a non-limiting example, Probe m may be executed if both Probes m−2 and m−1 return certain results and may not be executed if one or more both of Probes m−2 and m−1 do not return the certain results. As an additional non-limiting example, Probe m may be executed if one of Probes m−2 and m−1 returns a certain results and may not be executed if the certain result is not returned by Probe m−2 or m−1. In another non-limiting example, execution of a probe may be dependent upon earlier probe results and immediately prior probe results. For example, execution of probe m may be dependent upon the results returned from Probe 1 and Probe m−2 (and possibly other prior probes).

In some examples, different testing sequences may also be dependent on successful completion of other testing sequences. For example, suppose that Test A is configured to execute various probes to verify the availability of a network resource 130. As used herein, network resources 130 may include databases, applications, services, cloud applications or functions 154, network elements (e.g., routers, switches, etc.), web pages, or other network components and functionality. Test Z−1 may include probes configured to perform various tests on the network resource. As such, execution of Test Z−1 may be dependent on the results of Test A. For example, if Test A determines the network resource is available then Test Z−1 may be executed, but if Test A determines the network resource is not available then Test Z−1 may not be executed.

By configuring the various dependencies described above, a robust set of probing sequences for performing different types of application health checks may be defined using the testing UI without requiring the user that creates the test to know how to program or configure individual tests. Instead, the user may read a description of each available probe and select appropriate probes providing the desired testing functionality for a target health check. In an aspect, the testing UI may provide a hierarchical list of probe categories, such as to allow the user to select a category of network resources for a desired health check. For example, the probe categories may specify availability, interactivity, performance, or other categories. The availability category may include probes designed to perform availability health checks, such as to verify a database is online and accessible or that a service or network application is accessible. The interactivity category may include probes designed to test functionality provided by a network resource, such as to test whether information can be read from or written to a database or functionality of an application is operational (e.g., because a service may be available or accessible, but may not be fully functional). The performance category may include probes designed to test performance of a network resource, such as to test latency during communication with a network resource, load balancing functionality within a network element, or other types of performance metrics. The testing UI may also provide functionality for allowing a user to view network resources and select the target network resource for a particular test sequence. For example, if Test A is designed to test characteristics of a database (e.g., availability, ping, execution time, etc.), the user may view a list of databases and select the target of the database Test A will probe. Once the target is selected, the probe(s) may be automatically configured with appropriate details of the target network resource (e.g., network address information, etc.) to enable the probe to be executed. In an aspect, selection of one or more probes for inclusion in a test sequence may also cause additional probes to be automatically included in the test sequence. For example, selection of Probe 1 may automatically cause Probe m−1 to be included in Test A, while other probes included in Test A may require user selection via the interactive elements of the testing UI 210. In an aspect, a health check testing sequence may be configured using probes of a particular type. As a non-limiting example, a health check may be created using a plurality of probes designed to test the availability of one or more network resources (e.g., a database, a website or web page, network services or applications, and the like). In additional or alternative aspects more complex testing sequences may be designed using probes designed to test more than just the availability of network resources, as will be apparent from the concepts described herein.

Returning back to FIG. 2, the databases 220 of testing engine 200 are shown as including a test configuration(s) database 222 and a test results database(s) 224. The test configuration(s) database 222 may include an inventory of the available probes that may be selected via the testing UI 210. In an aspect, the test configuration(s) database 222 may additionally include information for configuring probes for different types of network resources. For example, the test configuration(s) database 222 may include information that may be used to configure a probe with different parameters depending on the type of network resource that is associated with a selected probe (e.g., one or more network address of a database, credentials for accessing a network resource, port configurations, commands to query or interact with a database or application, etc.). In an aspect, configuration information may be different for different probe types. For example, an https probe may only have target information, such as information regarding the URL to request (e.g., to test availability of a target network resource such as a web page). Probes designed to test databases may have different configuration information, such as credential information, host information, port information, a database name, and a select query to be performed. Configuration information for host monitoring and IBM MQ probes may contain the name of the target, name of the metric to be monitored and the associated threshold used to determine success/failure. In an aspect, configuration beyond a target address of the probe may be hidden from the users (e.g., via use of the testing proxy) to prevent users from learning the connection details included in the configuration information, which may enhance the security of the system. It is noted that the different types of configuration information described above have been provided for purposes of illustration, rather than by way of limitation and that other types of probe configuration information may be utilized in accordance with the concepts described herein to design and create testing sequences.

The test results database(s) 224 may include records containing results obtained during execution of one or more probes. Each of the records may include information associated with one or more probes. For example, the information in a record may include a timestamp corresponding to the date and time the probe was executed, a name of the executed probe, a result returned in response to execution of the probe, a target network resource associated with the probe, an amount of time required to execute the probe, information provided to the network resource during the probe (e.g., inputs provided to test functionality of a service or application, a record attempted to be written to a database, a record attempted to be retrieved from a database, etc.), other types of information, or a combination thereof.

The testing proxy 230 may sit between the test configuration(s) database(s) 222 and the testing UI 210. For example, the testing proxy 230 may be configured to retrieve the inventory of available probes from the test configuration (s) database(s) 222 and provide it to the testing UI 210. In an aspect, the testing proxy 230 may be configured to authenticate the user of the testing UI 210 has appropriate permissions to access the test configuration(s) database(s) 222 prior to providing the information. For example, the user may be authenticated via a username and password, a security token, two-factor authentication techniques, or another technique and the inventory of available probes may be provided to the testing UI 210 only upon successful authentication of the user's credentials. In an aspect, the inventory of available probes may be different depending on the credentials of the user. For example, a first user may be authorized to use a first portion of the inventory of available probes while a different user may be authorized to use a second portion of the inventor of available probes or all of the available probes. In an aspect, any authenticated user may view and utilize probes retrieved from the inventory of available probes via the testing proxy. Probes may be filtered by mnemonic and environment so that a test sequence is always a test of the same application in a specific environment. The testing UI may enable users to create, change or delete a testing sequence. In some aspects, those actions may need to be approved by the application owner of record before the action is allowed. By utilizing the testing proxy to control probe selection users of the testing UI do not have to worry about the probe configurations and can assume that the set of available probes are configured correctly and available for use in a testing sequence in accordance with the concepts described herein.

The testing service(s) 240 may be used to execute instances of the testing sequences defined using the testing UI 210. For example, the testing service(s) 240 may be configured to execute Test A by first executing Probe 1 and then executing additional probes of Test A until Probe m is executed or a probe prior to Probe m cannot be executed due to a stop criterion (e.g., one or more of the prior executed probes returns results that prevent further probes from being executed according to dependencies between the various probes of Tests A). In an aspect, the testing service may be unaware of any relationship between individual probes and the testing proxy may be responsible for coordinating execution of the testing sequence. For example, the testing proxy may be aware of the individual probes of a testing sequence and may send individual probes to the testing service(s) for execution. The testing proxy may then process the various probes of a testing sequence according to the timing and dependency information of the testing sequence, and process results returned by the testing service for each probe to determine if a stop criterion has been reached (e.g., execute a next probe if the most recent probe returned a pass result and stop execution of the testing sequence if the most recent probe returned a fail result).

In an aspect, the analytics 250 may be configured to evaluate and/or analyze results associated with execution of various ones of the probes. In an aspect, the analytics 250 may be incorporated into the probes. For example a probe may be configured to return a pass or fail result indicating the probe passed or failed one or more tests the probe was designed to evaluate) and output one or more metrics based on the analysis. For example, the analytics 250 of an availability probe may determine whether the results indicate a particular network resource is or is not available, and a pass fail metric may be returned (e.g., a pass metric may be returned to the testing proxy if the network resource is available and a fail metric may be returned if the network resource is not available). It is noted that more complex analytics and metrics may be utilized by probes or other components of the system to evaluate and analyze the results obtained via execution of a testing sequence in some examples. To illustrate, the analytics 250 may include analytics configured to generate one or more classification metrics based on the results returned by one or more probes. To illustrate, an availability probe may return information (e.g., a pass metric) indicating that the availability probe successfully connected to a database or application. The information may include one or more pieces of data associated with the execution of the probe, such as information regarding when the probe was executed (e.g., a timestamp of when a request to access a network resource was transmitted) and information regarding the result of the probe's execution (e.g., a timestamp of when the result was received, the contents of the result, etc.). The analytics 250 may determine the probe was successfully executed based on the information regarding the result of the probe's execution (e.g., the contents of the result) and may analyze the contents of the result to characterize the result, such as to determine the probes execution was below a threshold service level, an error was received during a portion of the execution of the probe, probe execution latency (e.g., how long was the delay between initiating execution of the probe and receiving the result(s)), or other types of characterizations of the result(s). In the example above, the probe may incorporate analytics to indicate the probe passed or failed and the testing proxy may incorporate analytics to classify the results of the test performed by the probe, such as to evaluate whether a network resource is performing within service level agreement parameters. In this manner, individual probes may provide analytics to return information regarding a specific test or operation of a testing sequence, but the testing proxy may use those results and metadata associated with the executed probes to characterize performance of the system in a more comprehensive manner that may provide additional insights into the state of a system where the testing sequences and probes are being utilized to perform testing.

In an aspect, the testing proxy or another element of the system may be configured to output an alert based on the results of the analysis of the probe result(s). For example, if an analytic determines that performance of a network resource is below a threshold level, an alert may be generated to indicate poor performance of the network resource. The alert may be generated as a message or notification to a computing device (e.g., a smartphone, a cellular phone, a personal digital assistant (PDA), a pager, a desktop computing device, a laptop computing device, a tablet computing device, a server, and the like). For example, in FIG. 1 the alert may be transmitted to the computing device 140, cloud logic 152, or another device.

The test controller 260 may be configured to manage the testing UI 210 and operations to initiate execution of testing sequences defined using the testing UI 210. For example, the test controller 260 may be configured to manage display of the testing UI 210 and provide functionality to support operations of the testing UI 210, such as to facilitate communication with the testing proxy 230 to retrieve test configuration information. Additionally, the test controller 260 may be configured to cause one or more testing sequences defined using the testing UI 210 to be stored in a database and initiate execution of one or more testing sequences. The test controller 260 may also provide functionality to monitor progress of testing sequence execution and may initiate application of one or more of the analytics 250 to the results of a testing sequence as it executes (e.g., to determine whether to execute a subsequent process within the testing sequence, generate an alert and/or control signal, or other operations).

Figure 3:
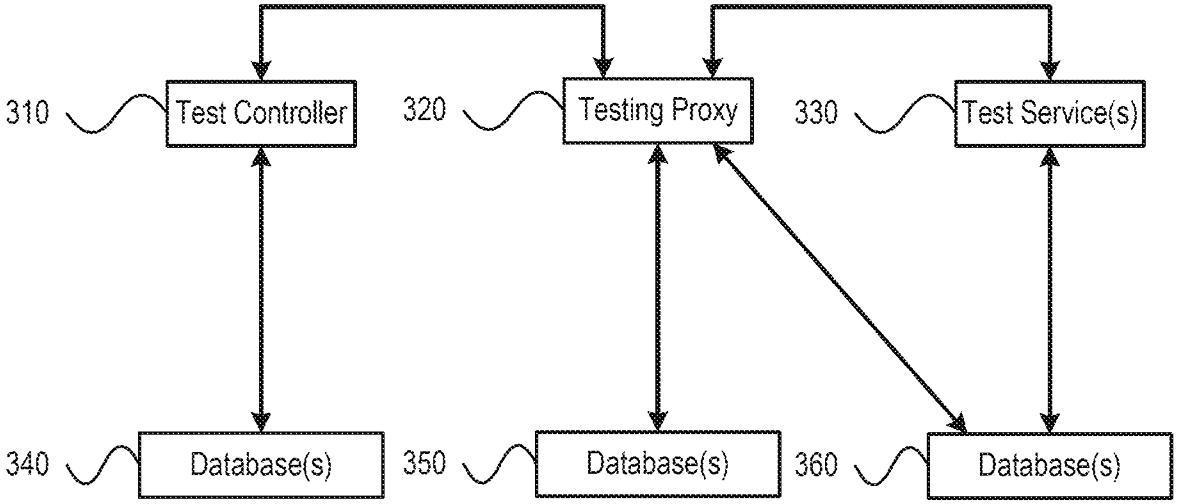
FIG. 3 shows an example process for designing and executing processes to evaluate performance of network resources in accordance with aspects of the present disclosure.

To further illustrate the above-described operations of the testing engine 200 (and the testing engine 120 of FIG. 1), and referring to FIG. 3, a block diagram illustrating an example process for performing a health check performed in accordance with aspects of the present disclosure is shown. In FIG. 3, a test controller 310, a testing proxy 320, one or more testing services 330, and databases 340-360 are shown. In an aspect, the test controller 310 may be the test controller 260 of FIG. 2 and may be operating based on an instance of a testing engine, such as the testing engine 200 of FIG. 2 or the testing engine 120 of FIG. 1. In an aspect, the testing proxy 320 may be the testing proxy 230 of FIG. 2 and may be operating based on an instance of a testing engine, such as the testing engine 200 of FIG. 2 or the testing engine 120 of FIG. 1. In an aspect, the testing service(s) 330 may be the testing service(s) 240 of FIG. 2 and may be operating based on an instance of a testing engine, such as the testing engine 200 of FIG. 2 or the testing engine 120 of FIG. 1. The testing proxy 320 may be associated with a database 350 configured to store data related to testing sequences. As a non-limiting example, the database 350 may store historical summary and detail information regarding executed testing sequences so that it can be retrieved for visualization within the testing UI. The summary information may include a run identifier (ID) (e.g., a unique ID), a testing sequence ID, mnemonic, environment data, overall result or the testing sequence pass/fail data, overall execution time, and a timestamp of when the testing sequence was initiated. Detail information for each executed probe in a testing sequence my include a probe ID, probe type, target, result (pass/fail), error message, execution time, or other data.

As explained above, the test engine 310 may be configured to display a testing UI (e.g., the testing UI 210 of FIG. 2). Inputs may be provided to the testing UI to configure a testing sequence, as explained above with reference to FIG. 2. During the creation of the testing sequence(s), the test controller 310 may communicate with the testing proxy 330 to obtain testing configuration data that may be used to populate one or more portions of the testing UI, as described above with reference to the testing UI 210 of FIG. 2. In an aspect, the testing configuration data may be retrieved in response to a request transmitted by the test controller 310 to the testing proxy 320. For example, when the testing UI is displayed, the test controller 310 may transmit a request to the testing proxy 320 to obtain testing configuration data that may be used to populate the testing UI with information regarding available probes that may be incorporated into a testing sequence via the testing UI. The test proxy 320 may retrieve the testing configuration data from a database, such as the database 360. In an aspect, the database 360 may be a portion of the testing configuration database 222 of FIG. 2 or one of the one or more databases 118 of FIG. 1. The testing proxy 320 may return the testing configuration data to the test controller 310 and the resting configuration data received by the test controller 310 may be used to populate the test UI with information regarding available probes. Once populated, a user may provide various inputs to the testing UI to design a testing sequence for evaluating one or more network resources. Once the testing sequence is defined, the testing sequence may then be stored in a database, which may be the database 340 and/or the database 360. Where the testing sequence is stored in the database 340, the information stored in connection with creation of the testing sequence may include identifiers associated with the testing sequence, such as information identifying each probe of the testing sequence, relationship data for each probe (e.g., information indicating what probes, if any, are dependent upon other probes, information indicating whether two or more probes may be executed concurrently, etc.), stop criteria for each probe of the testing sequence, and analytics data (e.g., data associating zero or more analytics (e.g., the analytics 250 of FIG. 2) with a particular probe of the testing sequence), and information identifying one or more network resources to which the testing sequence may be applied. It is noted that the information described above may not include portions of the testing configuration data retrieved by the testing proxy 320. In an aspect, the test controller 310 and the testing proxy 320 may have separate databases by design, such as to enforce segregation of responsibilities between the test controller 310 and the testing proxy 320. The test controller 310 may be responsible for managing testing sequence configurations and database 340 may be used to store the configuration information for testing sequences. The testing proxy 320 may be configured to manage execution of testing sequences based on the configuration information for each testing sequence and database 350 may be used to store the results obtained from execution of testing sequences.

Once one or more testing sequences are defined, the testing controller 310 may be configured to initiate execution of one or more of the testing sequences. It is noted that the testing sequence may be executed continuously or periodically. When executed continuously, the testing controller 310 may instantiate an instance of a testing service 330 corresponding to the testing sequence and the testing sequence may be executed according to its configuration. As a non-limiting example, the various probes of the testing sequence may be executed sequentially to obtain testing results that may be analyzed using one or more analytics (e.g., the one or more analytics 250 of FIG. 2). If an error occurs or a probe fails, an alert may be generated and/or one or more control signals configured to trigger execution of actions to try and resolve a cause of the error may be generated.

Where a testing sequence is executed periodically, the test controller 310 may be configured to maintain one or more timers that may be used to determine when to initiate a particular testing sequence. For example, the testing controller 310 may be configured to execute one or more testing sequences at a particular time interval (e.g. once every 5 minutes, once every 10 minutes, once every 15 minutes, once every 30 minutes, once every hour, once every 4 hours, once every 8 hours, once every 12 hours, once per day, once per week, or another time interval). At the appropriate time (e.g., according to timing parameters configured for the testing sequence), the testing controller 310 may be configured to send a control signal or message to the testing proxy 320 to cause a testing service 330 to be executed, where the executed testing service 330 corresponds to an instance of the testing sequence.

As explained above, the testing sequences correspond to groups of available probes each designed to evaluate one or more characteristics (e.g., availability, functional features, performance, etc.) of a network resource. That is to say, the testing UI enables select ones of the available probes to be grouped into a testing sequence that defines a hierarchical set of probes that should be executed. The hierarchy of the probes incorporated into the testing sequence may include different levels and probes in different levels may be executed sequentially subject to stop criterion defined for the testing sequence, while probes in a same level of the hierarchy may be executed simultaneously subject to any prerequisite conditions of a probe being satisfied (e.g., one or more prior probes successfully executed, particular results were obtained from one or more prior probes, etc.). Enabling sequential and simultaneous execution of probes within a testing sequence, coupled with the ability to define execution requirements that should be met prior to execution of probes, enables execution of probes in an efficient manner. For example, executing probes sequentially and incorporating stop criteria that can be used to prevent further probe execution if required conditions are not met (e.g., as defined by the stop criteria) reduces energy consumption of a device (e.g., the testing device(s) 110 of FIG. 1) or a cloud data center (e.g., cloud logic 152 of FIG. 1) since the testing sequence only executes completely when all probes complete when executed in the order configured within the testing sequence. Additionally, the ability to execute two or more probes simultaneously enables probes to be executed more quickly, which may be beneficial for some time sensitive monitoring operations.

In addition to the aforementioned benefits and improvements, the process illustrated in FIG. 3 also provides additional advantages and improvements over prior testing systems. For example, the functionality of the test controller 310 and the testing UI enables existing probes to be utilized in various combinations to create new testing sequences, as described above, thereby reducing the time to develop and deploy health checks tools. Additionally, it may reduce or eliminate the creation and use of redundant systems. Additionally, as the inventory of available probes changes, the changes may be readily incorporated into new probes (e.g., if a new probe replaces, enhances, or extends functionality of a probe currently included in one or more testing sequences, the new probe may be automatically or manually substituted into the one or more testing sequences having the old probe) and/or alerts can be generated when those changes impact existing probes (e.g., if a new probe replaces a probe currently included in one or more testing sequences, an alert may be generated to reconfigure the one or more testing sequences having the old probe). A system operating in accordance with the concepts described above may also allow both technical and non-technical users to create and run health checks in an intuitive manner using existing and proven monitoring system probes, thereby reducing or eliminating the need to perform substantive testing and troubleshooting of probes.

In addition to the above-described systems and methods for dynamic creation and execution of testing sequences based on leveraging existing probes, the systems and methods disclosed herein also provide additional functionality overcoming challenges with existing health check tools and probes. For example, the inventory of probes utilized to design and create testing sequences may include one or more WBS probes. As explained above, WBS probes may be used to run health checks in a manner that simulates user behaviors, but such probes cannot adapt to changes in the monitored targets (e.g., applications, services, webpages, etc.). Testing sequences designed in accordance with aspects of the present disclosure may overcome such challenges.

As a non-limiting example, suppose that a user wants to create a WBS probe to monitor that create item and delete item operations on a web application are working as expected. Using a testing UI (e.g., the testing UI 210 of FIG. 2) the user may create a Health Check with two WBS probes. The first WBS probe may be utilized to execute the create process and may receive a confirmation that the item was created successfully as a response after the create process completes. The second WBS probe may then be executed if an appropriate response is received from the first WBS probe (e.g., due to dependencies configured for a testing sequence including the first and second WBS probes), where the second probe is designed to locate the specific item that was created by the first WBS probe and delete that item.

One possible solution to determine the location the item to be deleted may involve the user of static rules to attempt identify the correct item. As a non-limiting example, a set of static rules that could be utilized may include sorting a table in which the new item is stored by most recently updated and delete the item most recently created. As an alternative example, the rules may be configured to search for a static name that is saved inside the WBS probe and delete the first item located. With either of these static rule-type approaches, the probes may fail to cleanup all items being used for the testing trigger(s) and/or a false alert may occur in which the application is working as expected but the probe results indicate an application error due to an unforeseen failure in the probe(s) or the inability of the probe to operate in a live environment (e.g., a non-test environment where other processes are actively operating on or interacting with a same network resource). For example, in a test environment, such as an isolated network resource used solely to test a prove prior to deployment of the probe, the first probe and second probe may be determined to function properly since the only thing operating within the test environment is the probes. However, in a live computing environment, such as a network environment where the probes may be deployed to monitor network resources, other network resources (e.g., processes and applications) running within the network environment may generate data. In such an environment, another item may be created (e.g., by another process or application) between a time when the first probe is run and when the second probe is run. If this occurs, the most recently updated item when the sorting is completed may not be the target of the second probe (i.e., may not be the item create by the first probe), resulting in a failure to of the second probe to clean up (e.g., delete) the data created by the first probe. When this happens, the second probe may delete data that should be retained (e.g., the data identified as having been modified but was created by something other than the first probe) and/or return an error (e.g., because the second probe cannot find the data generated by the first probe). This may also cause the second probe to return results that indicate an error (e.g., because the last item modified after the sorting is not a target item of the second probe). In the first situation the health check involving the first and second probes may indicate the network resource (e.g., a web page) is functioning properly when the network resource has not actually been verified to be functioning properly (e.g., because the data item created by the first probe is not the data item deleted by the second probe). The second situation may cause a false positive (e.g., because the data item created by the first probe may have been generated but because another network resource generated data after the first probe, the second probe cannot locate it). Such unforeseen effects can compromise the reliability of the health check designed using the first and second probes. Another potential problem that may occur and create problems for the first and second probes is an update to the network resource. For example, the web page being tested by the first and second probes may receive an update that changes the way data items are named, how data items are stored (e.g., the storage location), or other changes. In such instances, the health check may fail until the first and/or second probes are updated to deal with the changes to the network resource.

Figure 5:
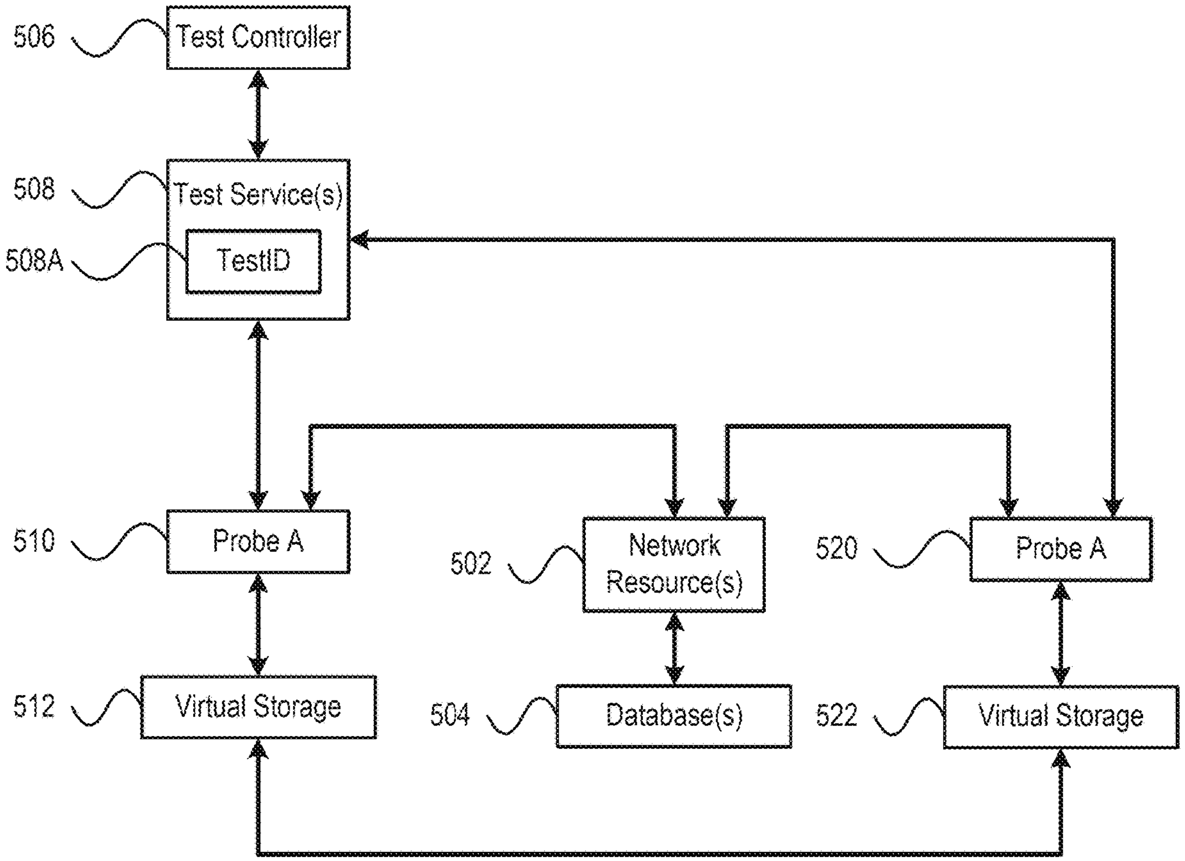
FIG. 5 shows an example process for sharing data between probes of a testing sequence in accordance with aspects of the present disclosure.

Referring to FIG. 5, a block diagram illustrating an example test sequence executed in accordance with aspects of the present disclosure is shown. In particular, FIG. 5 shows a network resource 502, a test controller 506, and two probes 510, 520. In an aspect, the network resource 502 may be a web page. As explained above, the test controller 506 may be configured to control or initiate execution of a testing sequence, which includes the probes 510, 520 in the example illustrated in FIG. 5. It is noted that while FIG. 5 shows two probes, the concepts described and illustrated with reference to FIG. 5 may be applied to testing sequences including more probes or less probes.

As explained in the example above where a first probe creates data and a second probe deletes the data created by the first probe, several challenges exist that may prevent proper execution of the probes or proper evaluation of the results of the probes (e.g., false positives or negatives). One reason for such challenges is that presently probes are not designed to pass data to each other. For example, WBS probes are created by a selenium IDE and are not designed to pass data between each other. In the example of FIG. 5 the probes 510, 520 would not be able to pass data to one another if the probes 510, 520 were presently available WBS probes. However, systems implementing the concepts described herein may execute probes in a manner that enables data to be passed between probes, thereby overcoming limitations and challenges present in existing probes, as described in more detail below.

As explained above with reference to FIG. 2, during configuration of the testing sequence, parameters of a testing sequence may be defined, where the parameters include a set of probes selected from among a suite of available probes, dependency information, and timing parameters for how often the testing sequence should be executed. In FIG. 5, the testing sequence includes the two probes 510, 520, where the probe 510 may designed to access the network resource 502 and attempt to write data to a database 504 using functionality of the network resource 502, and the probe 520 may be configured to delete the data written by the probe 510 from the database 504. The testing controller 506 may initiate execution of the testing sequence by sending a request to a testing service 506 (e.g., one of the testing services 240 of FIG. 2). In an example, the testing controller 506 initializes the testing service 508 by transmitting a request that includes information that identifies the testing sequence to be executed by the testing service 508. The testing service 508 may then retrieve configuration information for the probes of the testing sequence from a database (e.g., the testing configuration database 222 of FIG. 2 or the database 360 of FIG. 3). Alternatively, the testing controller 506 may retrieve the information from the database and pass the configuration information to the testing service 508.

The testing service 508 may use the configuration information to control execution of the probes defined in the testing sequence, taking into account any dependency information between various probes of the testing sequence, stop criteria defined for the testing sequence, information regarding whether any of the probes of the testing sequence may be executed, other types of configuration information, or a combination thereof. In the example of FIG. 5, the testing sequence may include the probes 510, 520, the dependency information may indicate the probe 510 is to be executed prior to the probe 520, and the stop criterion may indicate that probe 520 is not executed if probe 510 does not execute properly.

The testing service 508 may generate a unique identifier (TestID) corresponding to execution of the testing sequence. The testing service may then initialize execution of the probe 510 using the configuration information and the unique identifier. Where the probe 510 is a WBS probe, the testing service 508 may be a WBS Probe Runner. The WBS Probe Runner may execute one WBS probe at a time according to the dependency information, which may be achieved by passing the WBS Probe Runner one probe identifier at a time or by passing all of the (WBS) probes to be executed (or ready to be executed) and passing the dependency information (e.g., if the WBS Probe Runner service is configured to support execution of WBS probes based on dependency information). The WBS Probe Runner (e.g., the testing service 508) creates a unique folder 508A for each WBS probe execution, which may be labeled using the unique identifier generated by the testing service 508.

Using the received configuration information regarding the probe(s), the WBS Probe Runner may initialize an empty variable storage instance in memory. For example, for execution of the probe 510 the testing service 508 may initialize a variable storage memory 512, and for execution of the probe 520 the testing service 508 may initialize a variable storage memory 522. The WBS Probe configuration may contain a list of instructions which the WBS Probe Runner will execute in order. The list of instructions may include two types of commands that may interact with the variable storage initialized by the WBS Probe Runner. For example, a "store" command that specifies data to be stored and "retrieval" command that contains a text key that can be used by the "retrieval" command to obtain the data after storage. When a "store" command is executed, such as during execution of the probe 510, the WBS Probe Runner may insert the referenced data into the variable storage memory. A "retrieval" command must specify the key which must be retrieved. If the key to be retrieved does not exist in the variable storage instance a null value is returned. Thus, after the probe 510 is executed, information associated with the "store" command may be inserted into the variable storage memory 512.

After execution of a WBS Probe's command list the contents of variable storage may be serialized into text in a JavaScript Object Notation (JSON) format and written to a file stored in a known location configured at the beginning of probe execution, such as the folder 508A. The file may be named after the WBS probe identifier (e.g., "Results_Probe_510" for the probe 510, "Results_Probe_520" for the probe 520, etc.) and the WBS Probe Runner may generate a single file for each probe. Thus, the folder 508A may contain files corresponding to the results of each probe after all probes have been executed.

When the WBS Probe Runner executes a subsequent WBS probe as part of the same testing sequence, all previously serialized variable storage JSON files are loaded into memory to initialize the variable storage. As a result, the currently executing WBS probe may have access to data previously stored in the variable storage of one or more prior WBS probes. For example, the variable storage memory 522 of the probe 520 may be initialized with information from the serialized data recorded to the folder 508A based on execution of the probe 510. The subsequent WBS probe (e.g., the probe 520) may then be executed according to the steps above until all probes have been executed. Because a subsequently executed WBS probe may have access to data recorded to the variable storage memory during execution of a prior executed WBS probe, the subsequent probe(s) may utilize the unique identifier (TestID) added as a key to the data generated by one or more prior probes to locate relevant data for the subsequent probe(s). For example, data written by the probe 510 may be generated and have a name that incorporated the unique identifier (e.g., "Test_ID_operation-1-result"). Once this data is stored in the folder 508A, the probe 520 may distinguish the data resulting from execution of the probe 510 from other data based on the inclusion of the unique identifier.

In an aspect, the keys stored in the variable storage memory allocated to each WBS probe may include the unique identifier corresponding to the testing sequence execution and new unique identifiers may be generated each time a testing sequence is executed. This may enable each testing sequence execution to be distinguished from each other and allow a current testing sequence execution to locate information from other probes executed in the current execution of the testing sequence. In an aspect, values stored in associated with the unique identifier may be floating point numbers and the unique identifier may be a text value. It is noted that other data types may also be used in some configurations and implementations.

By enabling different probes to pass information between each other via the variable storage memory initialized prior to execution of each probe, the above-identified problems with existing probes are overcome and the reliability of probes when executed in a runtime network environment may be improved. To illustrate, and using the two probes from the example above, the probe 510 may interact with the network resource 502 (e.g., a web page) to generate a data item that may be recorded to a database 506. Information associated with the generation of that data item (e.g., the name of the data item, a time of creation of the data item, etc.) may be also recorded to the variable storage memory 512 initialized for the probe 510 and the unique identifier associated with the testing sequence being executed may be used as a key for the information associated with data item recorded to the variable storage memory 512. When the variable storage memory 522 for the probe 520 is initialized, the file generated upon completing execution of the probe 510, and which includes the file stored in the folder 508A from execution of the probe 510, may be accessible to the probe 520. Because the same unique identifier is used for each probe that is executed, the probe 520 may locate the information associated with the data item in the variable storage memory 522 using the unique identifier. Thus, if a last data item is not the data item generated by the probe 510, or the naming convention for the data item is not known or what is expected by the probe 520, the probe 520 may still be able to detect or locate the target data item based on identifying the data item associated with the unique identifier in the variable storage memory 522. The probe 520 may also use the information obtained from the variable storage memory 522 to find the data item (e.g., in the database 504) based on the unique identifier.

As shown above, example embodiments of the present disclosure enable data to be passed between different probes and a unique identifier may be used to locate elements of the web application which have been created by earlier probes. This enables later executed probes to avoid manipulating the incorrect elements during the test and ensures that each probe only modifies elements having the unique identifier being tracked (e.g., the unique identifier generated for execution of the testing sequence). It is noted that the ability to pass data between probes is not limited to the specific examples described herein and may be used to pass other types of information that may be used to configure how subsequent probes are executed, the network resources upon or portions of network resources upon which subsequent probes are executed, or other types of configuration controls. For example, information passed between WBS probes may be used to limit one or more pages being tested by WBS probes to only those a prior WBS probe has made a successful modification on (e.g., a successful probe execution). Further, it is noted that the ability to pass data between probes of a testing sequence is not limited to WBS probes. As a non-limiting example, a database probe for a MongoDB database may be configured to load data from the database into a data storage that may be read by a WBS Probe or other probe type. The data loaded into the data storage from the database may then be compared against a subsequent loading of data from the database and the two different snapshots of the database compared to detect data written by a probe (e.g., based on the unique identifier associated with the testing sequence or another technique). Such capability may also be used for validation, such as to verify that a data item was written to the database by a first probe and then successfully deleted by a second probe (e.g., using a third snapshot that may either match the first snapshot or omit the data item present in the second snapshot).

As shown above, embodiments of the present disclosure provide improvements to the functioning of probes used to interact with network resources by enabling probes to pass data between probes. Such features extend the capabilities of probes and allows more robust validation of probe operations. For example, by enabling data to be passed between probes more robust probe execution verification may be performed, such as to verify a prior probe executed properly (e.g., by verifying the results using the file recorded to the folder 508A) or other techniques. It is noted that the above-described technique may also be implemented and support datacenter agnostic operations. For example, the above-described technique for passing data between probes may probes executed in different data centers to exchange data to support one or both probes operations.

Figure 6:
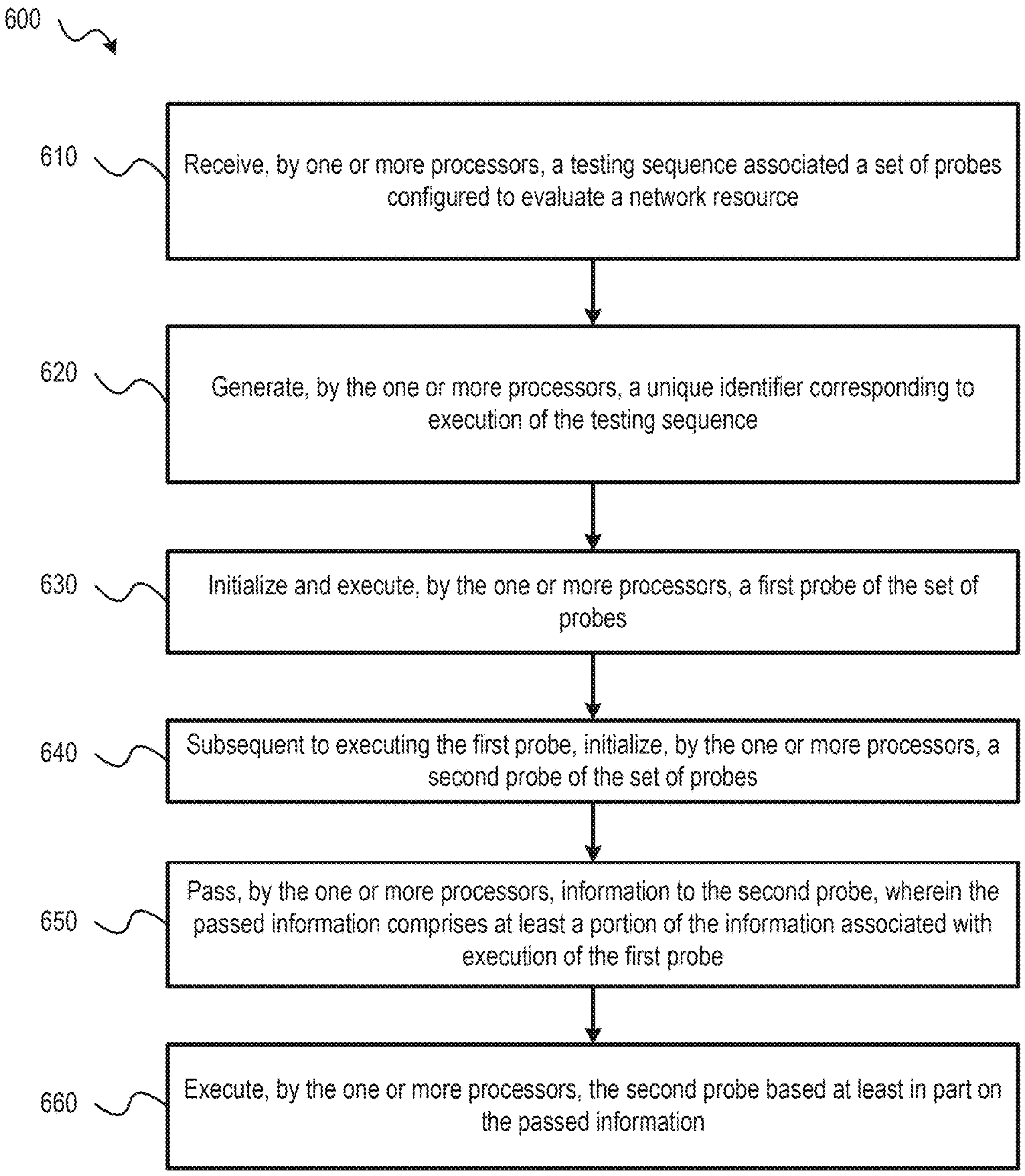
FIG. 6 shows a flow diagram of an example method for sharing data between probes of a testing sequence in accordance with aspects of the present disclosure.

Referring to FIG. 6, a flow diagram for an example method for sharing data between probes in accordance with aspects of the present disclosure is shown as a method 600. It is noted that the steps or operations described with reference to FIG. 6 are meant to further illustrate aspects of the functionality provided by the one or more testing engines (e.g., the testing engine 120 of FIG. 1, the testing engine 120 of FIG. 2). Thus, it is to be understood that the functionality described below with reference to the method 600 may be provided by the testing device 110, cloud logic 152, or other types of devices configured to perform the steps of the method 600. The steps or operations of the method 600 may be stored as instructions (e.g., the instructions 116 and/or the one or more testing engines 120 of FIG. 1) that, when executed by one or more processors (e.g., the one or more processors 112 and/or the one or more testing engines 120 of FIG. 1), cause the one or more processors to perform the steps of the method 600. It should be understood that the method 600 may be configured to perform various ones of the operations described above with reference to FIGS. 1-5.

At step 610, the method 600 comprises receiving, by one or more processors, a testing sequence associated a set of probes configured to evaluate a network resource. In an aspect, the testing sequence may be generated using a testing UI, such as the testing UI 210 described above with reference to FIG. 2. The testing sequence may include dependency data that identifies an order in which each probe of the set of probes is to be executed. As explained above, the testing sequence may also have other configuration information, such as dependency information, timing information (e.g., information that indicates whether two or more probes may be executed concurrently), and stop criteria (e.g., information that may be used to determine whether to stop execution of the testing sequence).

At step 620, the method 600 generating, by the one or more processors, a unique identifier corresponding to execution of the testing sequence. In an aspect, multiple unique identifiers may be generated. For example, a unique identifier may be generated for each execution of a testing sequence in order to enable different executions of a testing sequence to be distinguished from each other (e.g., to test multiple network resources using a same testing sequence simultaneously via different executions).

At step 630, the method 600 includes initializing and executing, by the one or more processors, a first probe of the set of probes. In an aspect, information associated with execution of the first probe is stored in a memory in association with the unique identifier. In an aspect, initialization of the first probe may include allocating a first virtual memory space (e.g., virtual memory space 512 of FIG. 5) of the memory to the first probe, and the information associated with execution of the first probe may be stored in the first virtual memory space.

At step 640, the method 600 includes initializing, by the one or more processors, a second probe of the set of probes subsequent to executing the first probe. At step 650, the method 600 includes passing, by the one or more processors, information to the second probe. In an aspect, the passed information may include at least a portion of the information associated with execution of the first probe. It is noted that steps 640 and 650 may be performed as separate steps or may be performed as a single step (e.g., as part of initialization). In an aspect, initialization of the second probe may include allocating a second virtual memory space (e.g., the virtual memory space 522 of FIG. 5) of the memory to the second probe. In an aspect, the passed information may be stored in the second virtual memory space during initialization of the second virtual memory space.

At step 660, the method 600 includes executing, by the one or more processors, the second probe based at least in part on the passed information. In an aspect, the second probe may identify a portion of the passed information as target information based on the unique identifier, and where at least the part of the passed information upon which execution of the second probe is base corresponds to the target information, such as to locate information associated with a data item generated by the first probe based on the passed information, and then perform one or more actions on the data item during execution of the second probe. In an aspect, a file may be generated based on the information associated with execution of the first probe (and the second probe). The file may be stored in a memory space associated with a testing service (e.g., the folder 508A of FIG. 5), and the testing service may pass the information to the second probe based on the file. In an aspect, the file may be stored in a JavaScript Object Notation (JSON) format.

As can be appreciated from the foregoing, the method 600 enables sharing or passing of data between different probes. In an aspect, the first probe and the second probe may be WBS probes and the method 600 may be utilized to share or pass data between the first and second WBS probes. Such capability to pass or share data between probes may enable more accurate testing of network resources, such as enabling testing of at least one web page of a website. For example, the first probe may be configured to perform a first action with respect to the network resource and the second probe may be configured to perform a second action with respect to the network resource, where the first and second actions may be different and in some instances, the second action may depend on an output resulting from the first action. As a non-limiting example, a first probe may execute a transaction via interaction with a network resource (e.g., a database, a web page, etc.) and store a transaction confirmation number in memory, and a second probe may log into a system (e.g., the same or a different system) and verify that the transaction was executed based on information passed to the second probe from memory. It is noted that the actions performed by probes as part of testing sequences generated and executed in accordance with aspects of the present disclosure may include other types of actions and probes.

Figure 7:
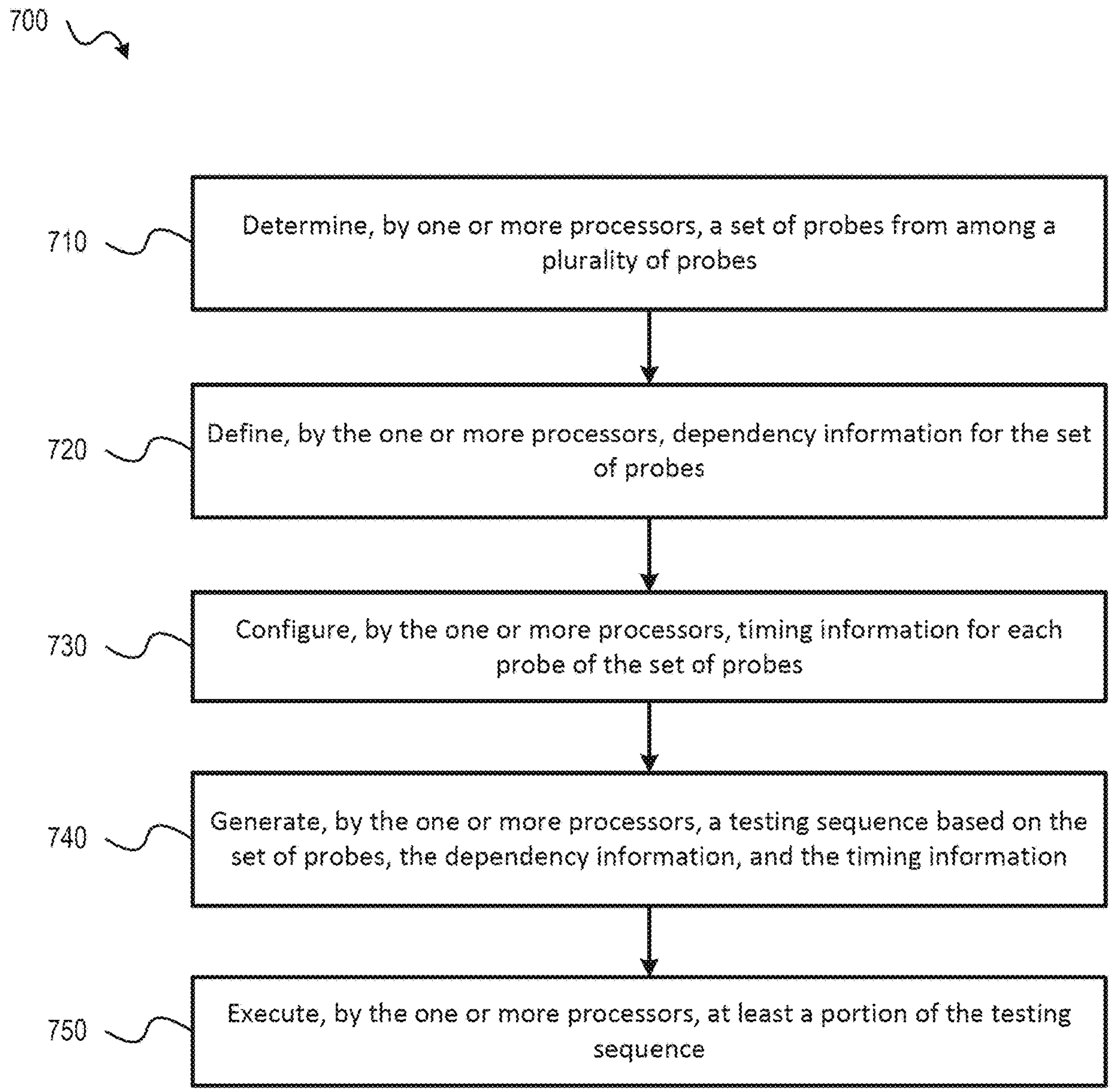
FIG. 7 shows a flow diagram of an example method for designing and executing processes to evaluate performance of network resources in accordance with aspects of the present disclosure.

Referring to FIG. 7, a flow diagram for an example method for monitoring a network resource in accordance with aspects of the present disclosure is shown as a method 700. It is noted that the steps or operations described with reference to FIG. 7 are meant to further illustrate aspects of the functionality provided by the one or more testing engines (e.g., the testing engine 120 of FIG. 1, the testing engine 120 of FIG. 2). Thus, it is to be understood that the functionality described below with reference to the method 700 may be provided by the testing device 110, cloud logic 152, or other types of devices configured to perform the steps of the method 700. The steps or operations of the method 700 may be stored as instructions (e.g., the instructions 116 and/or the one or more testing engines 120 of FIG. 1) that, when executed by one or more processors (e.g., the one or more processors 112 and/or the one or more testing engines 120 of FIG. 1), cause the one or more processors to perform the steps of the method 700. It should be understood that the method 700 may be configured to perform various ones of the operations described above with reference to FIGS. 1-6.

At step 710, the method 700 includes determining, by one or more processors, a set of probes from among a plurality of probes. As explained above, each probe of the plurality of probes may be configured to perform one or more operations with respect to one or more network resources or types of network resources. In an aspect, configuration information associated with the plurality of probes may be stored in a database. The information associated with the plurality of probes may be retrieved from the database by testing proxy and displayed in a user interface (e.g., the testing UI 210 of FIG. 2). The set of probes may then be determined based on inputs received via the user interface, such as selection of one or more probes using interactive elements of the user interface.

At step 720, the method 700 includes defining, by the one or more processors, dependency information for the set of probes. As explained above, the dependency information may specify and order of execution for the set of probes and organize the set of probes in a hierarchical manner. At step 730, the method 700 includes configuring, by the one or more processors, timing information for each probe of the set of probes. As explained above, the timing information may indicate whether a particular probe of the set of probes is executable simultaneously with another probe of the set of probes. As explained above, configuration information for the testing sequence may be stored in the database, where the configuration information may include the dependency information and the timing information. The configuration information may include other types of information, such as stop criteria, execution frequency data, and the like. For example, the method may additionally include generating stop criteria for the testing sequence. The stop criteria may include conditions, where each of the conditions corresponds to a probe of the set of probes. The stop criteria may be configured to stop execution of the testing sequence when execution of a particular probe of the set of probes satisfies a condition corresponding to the particular probe. At step 740, the method 700 includes generating, by the one or more processors, a testing sequence based on the set of probes, the dependency information, and the timing information. The testing sequence may be executable by a testing service to perform one or more tests associated with the one or more network resources. In an aspect, timing information may also be defined for the testing sequence (e.g., to control how often the testing sequence is executed).

At step 710, the method 700 includes executing, by the one or more processors, at least a portion of the testing sequence. As explained above, the testing sequence may be executed one probe at a time until the set of probes completes execution or until a stop criterion is satisfied. In an aspect, the testing sequence or configuration information of the testing sequence may be transmitted to a testing service. The testing service may be configured to initialize each probe of the set of probes based on the configuration information and execute each probe of the set probes based on the dependency information, the timing information, stop criteria, or a combination thereof. For example, the set of probes may include at least a first probe, a second probe, and a third probe, and the dependency information may indicate the first probe is to be executed prior to the second probe, and where the timing information may indicate the second probe is executable simultaneously with the third probe. The first probe may be executed and the testing service may verify whether any stop criteria are satisfied. For example, a result of the first probe may be evaluated to determine whether the first probe completed execution. If the first probe did not complete successfully, the testing service may stop or terminate execution of the testing sequence and may generate an alert indicating the testing sequence failed, as described above. If the first probe completed successfully, the testing service may determine to continue execution of the testing sequence and execute the second probe and the third probe simultaneously. After the first probe, the second probe, and/or the third probe have executed, one or more analytics may be executed to analyze the results of the probe(s). As noted above, one or more alerts may be generated based on the analytics and/or one or more actions to modify or alter an operation of the network resource, such as to initiate a restart of the network resource if a result of the probe indicates the network resource was not available or performance of the probe was degraded relative to a threshold level of performance.

Clause 1: A method for generating a testing sequence for evaluating a network resource, the method comprising: determining, by one or more processors, a set of probes from among a plurality of probes, wherein each probe of the plurality of probes is configured to perform one or more operations with respect to one or more network resources; defining, by the one or more processors, dependency information for the set of probes, wherein the dependency information specifies an order of execution for the set of probes; configuring, by the one or more processors, timing information for each probe of the set of probes, wherein the timing information indicates whether a particular probe of the set of probes is executable simultaneously with another probe of the set of probes; and generating, by the one or more processors, a testing sequence based on the set of probes, the dependency information, and the timing information, wherein the testing sequence is executable by a testing service to perform one or more tests associated with the one or more network resources.

Clause 2: The method of clause 1, further comprising storing information associated with the plurality of probes in a database.

Clause 3: The method of clause 1 or 2, further comprising: retrieving the information associated with the plurality of probes via a testing proxy; and displaying the information associated with the available probes in a user interface, wherein the set of probes is determined based on inputs received via the user interface.

Clause 4: The method of any of clauses 1-3, further comprising storing configuration information for the testing sequence in the database, wherein the configuration information includes the dependency information and the timing information.

Clause 5: The method of any of clauses 1-4, further comprising: transmitting the configuration information to a testing service, wherein the testing service is configured to initialize each probe of the set of probes based on the configuration information and execute each probe of the set probes based on the dependency information and the timing information.

Clause 6: The method of clause 5, wherein the set of probes comprises at least a first probe, a second probe, and a third probe, wherein the dependency information indicates the first probe is to be executed prior to the second probe, and wherein the timing information indicates the second probe is executable simultaneously with the third probe.

Clause 7: The method of clause 6, further comprising generating stop criteria for the testing sequence, wherein the stop criteria comprise conditions, each of the conditions corresponding to a probe of the set of probes, and wherein the stop criteria are configured to stop execution of the testing sequence when execution of a particular probe of the set of probes satisfies a condition corresponding to the particular probe.

Clause 8: The method of clause 7, further comprising: executing the first probe of the set of probes; obtaining a result of the first probe; and determining whether to terminate execution of the testing sequence based on a stop criterion associated with a first condition corresponding to the first probe and the result of the first probe.

Clause 9: The method of clause 8, further comprising executing the second probe and the third probe simultaneously in response to determining to not terminate the execution of the testing sequence.

Clause 10: The method of any of clauses 1-9, further comprising: executing the testing sequence; and applying one or more analytics to at least one result obtained from execution of set of probes of the testing, wherein the one or more analytics are configured to determine a characteristic of the network resource.

Clause 11: A non-transitory computer-readable medium storing instructions that, when executed by one or more processors, cause the one or more processors to perform operations for generating a testing sequence for evaluating a network resource, the operations comprising: determining a set of probes from among a plurality of probes, wherein each probe of the plurality of probes is configured to perform one or more operations with respect to one or more network resources; defining dependency information for the set of probes, wherein the dependency information specifies an order of execution for the set of probes; configuring timing information for each probe of the set of probes, wherein the timing information indicates whether a particular probe of the set of probes is executable simultaneously with another probe of the set of probes; and generating a testing sequence based on the set of probes, the dependency information, and the timing information, wherein the testing sequence is executable by a testing service to perform one or more tests associated with the one or more network resources.

Clause 12: The non-transitory computer-readable medium of clause 11, the operations comprising: storing information associated with the plurality of probes in a database; retrieving the information associated with the plurality of probes via a testing proxy; and displaying the information associated with the available probes in a user interface, wherein the set of probes is determined based on inputs received via the user interface.

Clause 13: The non-transitory computer-readable medium of clause 12, the operations comprising storing configuration information for the testing sequence in the database, wherein the configuration information includes the dependency information and the timing information.

Clause 14: The non-transitory computer-readable medium of clause 11, the operations comprising: transmitting the configuration information to a testing service, wherein the testing service is configured to initialize each probe of the set of probes based on the configuration information and execute each probe of the set probes based on the dependency information and the timing information.

Clause 15: The non-transitory computer-readable medium of clause 14, the operations further comprising generating stop criteria for the testing sequence, wherein the stop criteria comprise conditions, each of the conditions corresponding to a probe of the set of probes, and wherein the stop criteria are configured to stop execution of the testing sequence when execution of a particular probe of the set of probes satisfies a condition corresponding to the particular probe.

Clause 16: The non-transitory computer-readable medium of clause 14, wherein the set of probes comprises at least a first probe, a second probe, and a third probe, wherein the dependency information indicates the first probe is to be executed prior to the second probe, and wherein the timing information indicates the second probe is executable simultaneously with the third probe, the operations comprising: executing the first probe of the set of probes; obtaining a result of the first probe; and determining whether to terminate execution of the testing sequence based on a stop criterion associated with a first condition corresponding to the first probe and the result of the first probe.

Clause 17: The non-transitory computer-readable medium of clause 16, the operations comprising executing the second probe and the third probe simultaneously in response to determining to not terminate the execution of the testing sequence.

Clause 18: A system for generating a testing sequence for evaluating a network resource, the system comprising: a memory; and one or more processors communicatively coupled to the memory, the one or more processors configured to: determine a set of probes from among a plurality of probes, wherein each probe of the plurality of probes is configured to perform one or more operations with respect to one or more network resources; define dependency information for the set of probes, wherein the dependency information specifies an order of execution for the set of probes; configure timing information for each probe of the set of probes, wherein the timing information indicates whether a particular probe of the set of probes is executable simultaneously with another probe of the set of probes; and generate a testing sequence based on the set of probes, the dependency information, and the timing information, wherein the testing sequence is executable by a testing service to perform one or more tests associated with the one or more network resources.

Clause 19: The system of clause 18, the one or more processors configured to: retrieve the information associated with the plurality of probes via a testing proxy; display the information associated with the available probes in a user interface, wherein the set of probes is determined based on inputs received via the user interface; and store configuration information for the testing sequence in a database, wherein the configuration information includes the dependency information and the timing information.

Clause 20: The system of claim 18, the one or more processors configured to: transmit the configuration information to a testing service, wherein the testing service is configured to execute at least one probe of the set of probes based on the configuration information and execute the at least one probe based on the dependency information and the timing information.

Clause 21: A method for evaluating a network resource, the method comprising: receiving, by one or more processors, a testing sequence associated a set of probes configured to evaluate a network resource, wherein the testing sequence comprises dependency data that identifies an order in which each probe of the set of probes is to be executed; generating, by the one or more processors, a unique identifier corresponding to execution of the testing sequence; initializing and executing, by the one or more processors, a first probe of the set of probes, wherein information associated with execution of the first probe is stored in a memory in association with the unique identifier; subsequent to executing the first probe, initializing, by the one or more processors, a second probe of the set of probes, wherein information associated with execution of the second probe is stored in the memory; passing, by the one or more processors, information to the second probe, wherein the passed information comprises at least a portion of the information associated with execution of the first probe; and executing, by the one or more processors, the second probe based at least in part on the passed information.

Clause 22: The method of clause 21, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space.

Clause 23: The method of clause 22, wherein the second probe identifies a portion of the passed information as target information based on the unique identifier, and wherein at least the part of the passed information upon which execution of the second probe is base corresponds to the target information.

Clause 24: The method of clause 22 or 23, further comprising generating a file based on the information associated with execution of the first probe and storing the file in a memory space associated with a testing service, wherein the testing service passes the information to the second probe based on the file.

Clause 25: The method of clause 24, wherein the file is stored in a JavaScript Object Notation (JSON) format.

Clause 26. The method of clause 21, wherein the first probe and the second probe comprise web based synthetic (WBS) probes.

Clause 27: The method of any of clauses 21-26, wherein the network resource comprises at least one web page.

Clause 28: The method of any of clauses 21-27, wherein the first probe is configured to perform a first action with respect to the network resource and the second probe is configured to perform a second action with respect to the network resource.

Clause 29: The method of clause 28, wherein the first action comprises executing a transaction and the second action comprises verifying the transaction was executed.

Clause 30: A non-transitory computer-readable storage medium storing instructions that, when executed by one or more processors, cause the one or more processors to perform operations for evaluating a network resource, the operations comprising: receiving a testing sequence associated a set of probes configured to evaluate a network resource, wherein the testing sequence comprises dependency data that identifies an order in which each probe of the set of probes is to be executed; generating a unique identifier corresponding to execution of the testing sequence; initializing and executing a first probe of the set of probes, wherein information associated with execution of the first probe is stored in a memory in association with the unique identifier; subsequent to executing the first probe, initializing a second probe of the set of probes, wherein information associated with execution of the second probe is stored in the memory; passing information to the second probe, wherein the passed information comprises at least a portion of the information associated with execution of the first probe; and executing the second probe based at least in part on the passed information.

Clause 31: The non-transitory computer-readable storage medium of clause 30, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space.

Clause 32: The non-transitory computer-readable storage medium of clauses 30 or 31, wherein the second probe identifies a portion of the passed information as target information based on the unique identifier, and wherein at least the part of the passed information upon which execution of the second probe is base corresponds to the target information.

Clause 33: The non-transitory computer-readable storage medium of any of clauses 30-31, the operations comprising generating a file based on the information associated with execution of the first probe and storing the file in a memory space associated with a testing service, wherein the testing service passes the information to the second probe based on the file.

Clause 34: The non-transitory computer-readable storage medium of clause 33, wherein the file is stored in a JavaScript Object Notation (JSON) format.

Clause 35: The non-transitory computer-readable storage medium of any of clauses 30-34, wherein the first probe and the second probe comprise web based synthetic (WBS) probes, and wherein the network resource comprises at least one web page.

Clause 36: The non-transitory computer-readable storage medium of any of clauses 30-35, wherein the first probe is configured to perform a first action with respect to the network resource and the second probe is configured to perform a second action with respect to the network resource.

Clause 37: A system for evaluating a network resource, the system comprising: a memory; and one or more processors communicatively coupled to the memory, the one or more processors configured to: receive a testing sequence associated a set of probes configured to evaluate a network resource, wherein the testing sequence comprises dependency data that identifies an order in which each probe of the set of probes is to be executed; generate a unique identifier corresponding to execution of the testing sequence; initialize and execute a first probe of the set of probes, wherein information associated with execution of the first probe is stored in a memory in association with the unique identifier; subsequent to executing the first probe, initialize a second probe of the set of probes, wherein information associated with execution of the second probe is stored in the memory; pass information to the second probe, wherein the passed information comprises at least a portion of the information associated with execution of the first probe; and execute the second probe based at least in part on the passed information.

Clause 38: The system of clause 37, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space.

Clause 39: The system of clause 37 or 38, wherein the second probe identifies a portion of the passed information as target information based on the unique identifier, and wherein at least the part of the passed information upon which execution of the second probe is base corresponds to the target information.

Clause 40: The system of any of clauses 37-38, wherein the one or more processors are configured to generate a file based on the information associated with execution of the first probe and storing the file in a memory space associated with a testing service, wherein the testing service passes the information to the second probe based on the file.

Clause 41: The system of any of clauses 37-40, wherein the first probe is configured to perform a first action with respect to the network resource and the second probe is configured to perform a second action with respect to the network resource that is different from the first action.

Clause 42: A method comprising the steps of any of the methods of clauses 1-10 and 20-29.

Clause 43: A non-transitory computer-readable medium storing instructions that, when executed by one or more processors, cause the one or more processors to perform operations according to the steps of any of the methods of clauses 1-10 and 20-29.

Clause 44: A system comprising: a memory; and one or more processors communicatively coupled to the memory, the one or more processors configured to perform the steps of any of the methods of clauses 1-10 and 20-29.

Clause 45: a Method Comprising the Operations of Any of FIGS. 1-7.

Clause 46: A non-transitory computer-readable medium storing instructions that, when executed by one or more processors, cause the one or more processors to perform operations of any of FIGS. 1-7.

Clause 47: A system comprising: a memory; and one or more processors communicatively coupled to the memory, the one or more processors configured to perform the operations of any of FIGS. 1-7.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for evaluating a network resource, the method comprising:

receiving, by one or more processors, a testing sequence associated with a set of probes configured to evaluate a network resource, wherein the testing sequence comprises dependency data that identifies an order in which each probe of the set of probes is to be executed;

generating, by the one or more processors, a unique identifier corresponding to execution of the testing sequence;

initializing and executing, by the one or more processors, a first probe of the set of probes, wherein information associated with execution of the first probe is stored in a memory in association with the unique identifier;

subsequent to executing the first probe, initializing, by the one or more processors, a second probe of the set of probes, wherein information associated with execution of the second probe is stored in the memory;

passing, by the one or more processors, information to the second probe, wherein the passed information comprises at least a portion of the information associated with execution of the first probe; and executing, by the one or more processors, the second probe based at least in part on the passed information.

2. The method of claim 1, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space.

3. The method of claim 2, wherein the second probe identifies a portion of the passed information as target information based on the unique identifier, and wherein at least the part of the passed information upon which execution of the second probe is base corresponds to the target information.

4. The method of claim 2, further comprising generating a file based on the information associated with execution of the first probe and storing the file in a memory space associated with a testing service, wherein the testing service passes the information to the second probe based on the file.

5. The method of claim 4, wherein the file is stored in a JavaScript Object Notation (JSON) format.

6. The method of claim 1, wherein the first probe and the second probe comprise web based synthetic (WBS) probes.

7. The method of claim 1, wherein the network resource comprises at least one web page.

8. The method of claim 1, wherein the first probe is configured to perform a first action with respect to the network resource and the second probe is configured to perform a second action with respect to the network resource.

9. The method of claim 8, wherein the first action comprises executing a transaction and the second action comprises verifying the transaction was executed.

10. A non-transitory computer-readable storage medium storing instructions that, when executed by one or more processors, cause the one or more processors to perform operations for evaluating a network resource, the operations comprising:

receiving a testing sequence associated with a set of probes configured to evaluate a network resource, wherein the testing sequence comprises dependency data that identifies an order in which each probe of the set of probes is to be executed;

generating a unique identifier corresponding to execution of the testing sequence;

initializing and executing a first probe of the set of probes, wherein information associated with execution of the first probe is stored in a memory in association with the unique identifier;

subsequent to executing the first probe, initializing a second probe of the set of probes, wherein information associated with execution of the second probe is stored in the memory;

passing information to the second probe, wherein the passed information comprises at least a portion of the information associated with execution of the first probe; and executing the second probe based at least in part on the passed information.

11. The non-transitory computer-readable storage medium of claim 10, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space.

12. The non-transitory computer-readable storage medium of claim 11, wherein the second probe identifies a portion of the passed information as target information based on the unique identifier, and wherein at least the part of the passed information upon which execution of the second probe is base corresponds to the target information.

13. The non-transitory computer-readable storage medium of claim 11, the operations comprising generating a file based on the information associated with execution of the first probe and storing the file in a memory space associated with a testing service, wherein the testing service passes the information to the second probe based on the file.

14. The non-transitory computer-readable storage medium of claim 13, wherein the file is stored in a JavaScript Object Notation (JSON) format.

15. The non-transitory computer-readable storage medium of claim 10, wherein the first probe and the second probe comprise web based synthetic (WBS) probes, and wherein the network resource comprises at least one web page.

16. The non-transitory computer-readable storage medium of claim 10, wherein the first probe is configured to perform a first action with respect to the network resource and the second probe is configured to perform a second action with respect to the network resource.

17. A system for evaluating a network resource, the system comprising:

a memory; and one or more processors communicatively coupled to the memory, the one or more processors configured to:

receive a testing sequence associated with a set of probes configured to evaluate a network resource, wherein the testing sequence comprises dependency data that identifies an order in which each probe of the set of probes is to be executed;

generate a unique identifier corresponding to execution of the testing sequence;

initialize and execute a first probe of the set of probes, wherein information associated with execution of the first probe is stored in a memory in association with the unique identifier;

subsequent to executing the first probe, initialize a second probe of the set of probes, wherein information associated with execution of the second probe is stored in the memory;

pass information to the second probe, wherein the passed information comprises at least a portion of the information associated with execution of the first probe; and execute the second probe based at least in part on the passed information.

18. The system of claim 17, wherein initialization of the first probe comprises allocating a first virtual memory space of the memory to the first probe, wherein the information associated with execution of the first probe is stored in the first virtual memory space, wherein initialization of the second probe comprises allocating a second virtual memory space of the memory to the second probe, and wherein the passed information is stored in the second virtual memory space during initialization of the second virtual memory space, wherein the second probe identifies a portion of the passed information as target information based on the unique identifier, and wherein at least the part of the passed information upon which execution of the second probe is base corresponds to the target information.

19. The system of claim 18, wherein the one or more processors are configured to generate a file based on the information associated with execution of the first probe and store the file in a memory space associated with a testing service, wherein the testing service passes the information to the second probe based on the file.

20. The system of claim 17, wherein the first probe is configured to perform a first action with respect to the network resource and the second probe is configured to perform a second action with respect to the network resource that is different from the first action.

* * * * *